United States Patent
Oikawa et al.

(10) Patent No.: US 10,673,291 B2
(45) Date of Patent: Jun. 2, 2020

(54) PERMANENT-MAGNET ELECTRIC MOTOR

(71) Applicant: Mitsubishi Electric Corporation, Tokyo (JP)

(72) Inventors: Tomoaki Oikawa, Tokyo (JP); Mineo Yamamoto, Tokyo (JP); Hiroyuki Ishii, Tokyo (JP); Hiroki Aso, Tokyo (JP); Junichiro Oya, Tokyo (JP); Yuto Urabe, Tokyo (JP); Takaya Shimokawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 312 days.

(21) Appl. No.: 15/561,561

(22) PCT Filed: Jun. 17, 2015

(86) PCT No.: PCT/JP2015/067518
§ 371 (c)(1),
(2) Date: Sep. 26, 2017

(87) PCT Pub. No.: WO2016/203592
PCT Pub. Date: Dec. 22, 2016

(65) Prior Publication Data
US 2018/0091008 A1 Mar. 29, 2018

(51) Int. Cl.
*H02K 1/27* (2006.01)
*H02K 29/08* (2006.01)
(Continued)

(52) U.S. Cl.
CPC ............. *H02K 1/276* (2013.01); *H02K 1/02* (2013.01); *H02K 1/146* (2013.01); *H02K 11/215* (2016.01); *H02K 21/16* (2013.01); *H02K 29/08* (2013.01)

(58) Field of Classification Search
CPC ........ H02K 11/215; H02K 1/02; H02K 1/146; H02K 1/276; H02K 21/16; H02K 29/08
(Continued)

(56) References Cited

U.S. PATENT DOCUMENTS 7,294,944 B2 * 11/2007 Fujii .................... H02K 1/2733
310/156.05
2007/0194649 A1 8/2007 Schaefer et al.
(Continued)

FOREIGN PATENT DOCUMENTS

JP S62-126889 A 6/1987
JP H02-033586 U 3/1990
(Continued)

OTHER PUBLICATIONS

International Search Report of the International Searching Authority dated Sep. 8, 2015 for the corresponding international application No. PCT/JP2015/067518 (and English translation).
(Continued)

*Primary Examiner* — Jue Zhang
*Assistant Examiner* — Bart Iliya
(74) *Attorney, Agent, or Firm* — Posz Law Group, PLC

(57) ABSTRACT

A permanent-magnet electric motor includes an annular stator core, a rotor core, and a rotating-position detection sensor. In each of a plurality of magnet insertion holes formed in the rotor core, a rare-earth magnet and a ferrite magnet are disposed adjacent to each other in an axial direction of the rotor core. The rotor core has an axial length longer than an axial length of the stator core. The rare-earth magnet is disposed in each of the magnet insertion holes to be opposed to the stator core in a radial direction of the stator core. The ferrite magnet disposed in each of the magnet insertion holes is disposed between the rare-earth magnet
(Continued)

disposed in the corresponding magnet insertion hole and the rotating-position detection sensor.

6 Claims, 5 Drawing Sheets

(51) Int. Cl.
    *H02K 21/16*     (2006.01)
    *H02K 1/14*     (2006.01)
    *H02K 11/215*     (2016.01)
    *H02K 1/02*     (2006.01)

(58) Field of Classification Search
    USPC .................................................. 310/156.05
    See application file for complete search history.

(56) References Cited

U.S. PATENT DOCUMENTS

| | | | |
|---|---|---|---|
| 2009/0128075 A1 | 5/2009 | Hiwaki et al. | |
| 2013/0026888 A1* | 1/2013 | Migita | H02K 29/08 310/68 B |
| 2014/0167572 A1* | 6/2014 | Woo | H02K 11/215 310/68 B |
| 2018/0109167 A1* | 4/2018 | Oikawa | H02K 11/215 |

FOREIGN PATENT DOCUMENTS

| | | |
|---|---|---|
| JP | H05-236689 A | 9/1993 |
| JP | H06-038479 A | 2/1994 |
| JP | H09-093842 A | 4/1997 |
| JP | H11-299207 A | 10/1999 |
| JP | 2001-186722 A | 7/2001 |
| JP | 2001-186744 A | 7/2001 |
| JP | 2002-078309 A | 3/2002 |
| JP | 2007-143335 A | 6/2007 |
| JP | 2007-151314 A | 6/2007 |
| JP | 2007-530850 A | 11/2007 |
| JP | 2010-068600 A | 3/2010 |
| WO | 2013/114541 A1 | 8/2013 |
| WO | WO-2013114541 A1 * | 8/2013 |

OTHER PUBLICATIONS

Office Action dated Jan. 23, 2018 issued in corresponding JP patent application No. 2017-524220 (and English translation).

* cited by examiner

PERMANENT-MAGNET ELECTRIC MOTOR

CROSS REFERENCE TO RELATED APPLICATION

This application is a U.S. national stage application of International Patent Application No. PCT/JP2015/067518 filed on Jun. 17, 2015, the disclosure of which is incorporated herein by reference.

TECHNICAL FIELD

The present invention relates to a permanent-magnet electric motor including a stator, a rotor, and a rotating-position detection sensor for detecting a rotating position of the rotor.

BACKGROUND

When a distance between a main magnet attached to a rotor of a permanent-magnet electric motor and a rotating-position detection sensor provided on a stator is short, it is possible to detect a main magnetic flux generated from the main magnet for rotating the rotor. However, when the rotating-position detection sensor approaches a coil end of a winding part projected from the stator, the main magnetic flux of the main magnet is disturbed by the influence of a magnetic flux generated by a current flowing through the coil end. There is a case where position detection accuracy is deteriorated. Specifically, in a case where the motor is miniaturized, an influence of manufacturing error becomes large. Therefore, it is important to improve the position detection accuracy.

In a motor disclosed in Patent Literature 1, a main magnet and a position detection magnet are separated pieces. A rotating-position detection sensor is disposed apart from a stator coil, and the position detection magnet is disposed close to the rotating-position detection sensor. With this structure, the motor shown in Patent Literature 1 can eliminate the influence of a magnetic flux generated by the coil. Also, the main magnet and the position detection magnet are integrated with a rotor core so as to reduce variations in an assembling work.

A motor disclosed in Patent Literature 2 is configured so as to avoid the influence of a disturbance caused by a magnetism of a stator. To this end, the length in an axial direction of a permanent magnet forming a rotor is made longer than the length of the stator so that a part of the permanent magnet is extended in the axial direction from an action part of the stator, and a position detection sensor is provided in the extended part. With this structure, there is no need to provide a permanent magnet on a shaft for detection of the rotating position.

In a motor disclosed in Patent Literature 3, a rotor core includes two rotor cores, i.e., a first rotor core and a second rotor core which are obtained by dividing the rotor core in the axial direction of a rotor. A rare-earth magnet is inserted into the first rotor core, and a ferrite magnet is inserted into the second rotor core. Also, Patent Literature 3 discloses a structural example in which the second rotor core is disposed axially outside an end of a stator core.

PATENT LITERATURE

Patent Literature 1: JP 2007-151314 A
Patent Literature 2: JP H06-38479 A
Patent Literature 3: JP 2010-68600 A

SUMMARY

However, the motors disclosed in Patent Literatures 1 to 3 have had the following problems. It has been indicated that in the motor in Patent Literature 1, the orientation of the main magnet and that of the position detecting magnet are different from each other. This indicates that the magnets are respectively magnetized by different magnetizing yokes. In this case, if a phase shift occurs in the magnetizing yokes, an alignment deviation occurs due to the magnetization, and the main magnet and the position detecting magnet are magnetically deviated. When a phase shift occurs in the magnetizing yoke which is a manufacturing facility of the motor, phase shifts are accumulated, and it becomes difficult to obtain accuracy. Also, since the rotor used for the motor in Patent Literature 1 is not an interior magnet type rotor, a magnetic flux of the position detecting magnet cannot be used to assist a magnetic flux of the main magnet in producing a torque. In the motor of Patent Literature 2, there is no need to include a permanent magnet provided on the shaft for detection of the rotating position. However, in recent years, a rare-earth magnet is often used as a permanent magnet in response to a demand of high efficiency of motors. Therefore, in a case where an expensive rare-earth magnet is extended in the axial direction to be longer than the length of the stator, the extended part does not contribute to the motor torque, and cost performance becomes low when an amount of magnets are increased for the position detection. Regarding the motor, Patent Literature 3 does not disclose that the rotating-position detection sensor senses the ferrite magnet, and also, the structure of the motor does not eliminate a phase shift by inserting the rare-earth magnet and the ferrite magnet into the same magnet insertion hole. Patent Literature 3 discloses that the positional relationship between the rare-earth magnet and the ferrite magnet is "it is preferable that the pole centers of the rare-earth magnet and the ferrite magnet substantially coincide with each other". Further, Patent Literature 3 discloses that "it is preferable that the magnet insertion hole of the first rotor and the magnet insertion hole of the second rotor are at least partially overlapped with each other in the radial direction".

The present invention has been made in consideration of the above. A purpose of the present invention is to obtain a permanent-magnet electric motor that can accurately detect a rotating position of a rotor while suppressing an increase in cost.

To solve the foregoing problems and achieve the object, a permanent-magnet electric motor according to the present invention includes: an annular stator core; a rotor core that is disposed in the stator core and has a plurality of magnet insertion holes; and a rotating-position detection sensor that is disposed to be opposed to the rotor core and detects a rotating position of the rotor core, wherein in each of the plurality of magnet insertion holes, a rare-earth magnet and a ferrite magnet are disposed adjacent to each other in an axial direction of the rotor core, the rare-earth magnet and the ferrite magnet are disposed in a single, identical magnet insertion hole, a length of the rotor core in the axial direction is longer than a length of the stator core in the axial direction, the rare-earth magnet is disposed in each of the plurality of magnet insertion holes to be opposed to the stator core in a radial direction of the stator core, the ferrite magnet disposed in each of the plurality of magnet insertion holes is disposed between the rare-earth magnet disposed in a corresponding magnet insertion hole of the plurality of magnet insertion holes and the rotating-position detection sensor, and when a distance in the axial direction from the ferrite magnet to the rotating-position detection sensor is L1 and a distance in the axial direction from the rare-earth magnet to the rotating-position detection sensor is L2, the distance L1 is shorter than the distance L2.

A permanent-magnet electric motor according to the present invention has an effect that a rotating position of a rotor can be accurately detected while suppressing an increase in cost.

DETAILED DESCRIPTION

A permanent-magnet electric motor according to embodiments of the present invention is described in detail below with reference to the drawings. The present invention is not limited to the embodiments.

First Embodiment

Figure 1:
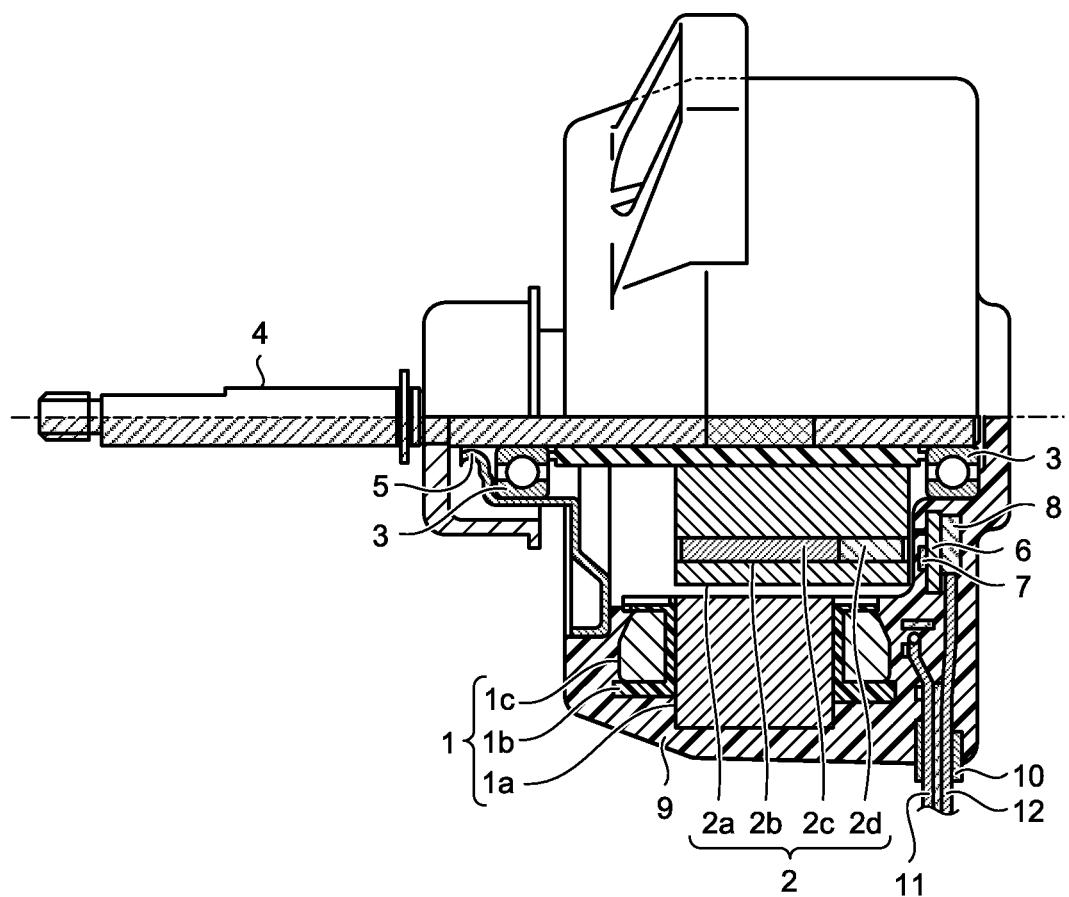
FIG. 1 is a side view of a permanent-magnet electric motor according to a first embodiment.

FIG. 1 is a side view of a permanent-magnet electric motor according to a first embodiment. An electric motor 100, which is the permanent-magnet electric motor, includes a stator 1, a rotor 2 disposed in the stator 1, a rotary shaft 4 passing through the center of the rotor 2, a pair of bearings 3 rotatably supporting the rotary shaft 4, a control board 6, a rotating-position detection sensor 7 which is positioned on a side of one end surface in an axial direction of the rotor 2 and is disposed on the control board 6, a molding resin 9 which forms an outline of the electric motor 100 and is formed of a thermosetting resin forming a housing for surrounding an outer ring of the bearing 3 disposed on the side of one end of the stator 1, and a bracket 5 which surrounds an outer ring of the bearing 3 disposed on the side of the other end of the stator 1 and is fitted into an inner peripheral surface of an opening formed of the molding resin 9.

The stator 1 includes a stator core 1a formed by laminating a plurality of iron core pieces punched out from an electromagnetic steel sheet base material having a thickness of 0.2 mm to 0.5 mm, an insulation material 1b formed integrally with the stator core 1a or fitted into the stator core 1a after having been manufactured separately from the stator core 1a, and a winding 1c made of copper or aluminum wound around a tooth (not shown) of the stator core 1a. The insulation material 1b is made of an insulating resin such as polybutylene terephthalate (PBT), poly phenylene sulfide (PPS), liquid crystal polymer (LCP), and polyethylene terephthalate (PET), or paper.

An interior permanent magnet (IPM) rotor 2 has a core loss value same as or larger than that of the stator and is formed by laminating a plurality of iron core pieces punched out from the electromagnetic steel sheet base material having a thickness of 0.2 mm to 0.5 mm. A plurality of magnet insertion holes 2b is provided in the rotor 2, and magnets are inserted into the respective magnet insertion holes 2b. Specifically, the rotor 2 has a rotor core 2a which is provided on an outer periphery of the rotary shaft 4 and has the plurality of magnet insertion holes 2b disposed to be spaced apart from each other in a rotation direction of the rotor core 2a, and a rare-earth magnet 2c and a ferrite magnet 2d are disposed adjacent to each other in the axial direction in each of the plurality of magnet insertion holes 2b. The rotor core 2a has an axial length longer than an axial length of the stator core 1a, and the rare-earth magnet 2c is disposed in each of the plurality of magnet insertion holes 2b to be opposed to the stator core 1a in a radial direction of the stator core 1a. The ferrite magnet 2d disposed in each of the plurality of magnet insertion holes 2b is disposed between the rare-earth magnet 2c disposed in the corresponding magnet insertion hole 2b of the plurality of magnet insertion holes 2b and the rotating-position detection sensor.

Although the rare-earth magnet 2c is expensive, the magnetic force of the rare-earth magnet 2c is strong. Therefore, the rare-earth magnet 2c is effective in increasing the torque of the motor and miniaturizing the motor, and the rare-earth magnet 2c is used as the main magnet. An inexpensive ferrite magnet 2d is used to detect the position because the magnetic force may be weak for position detection. For the rare-earth magnet 2c, an Nd—Fe—B based magnet composed of neodymium (Nd), ferrum (Fe) and boron (B) or a Sm—Fe—N based magnet composed of samarium (Sm), ferrum, and nitrogen (N) is used. Also, for the rare-earth magnet 2c, a sintered magnet type or a bonded magnet type is used in addition to the ferrite magnet 2d. Although having a strong magnetic force, the sintered magnet is formed into simple shapes. Therefore, in a case where a magnet insertion hole 2b having a complicated shape is employed, the bonded magnet may be used. By inserting the rare-earth magnet 2c which is the main magnet and the ferrite magnet 2d which is the position detection magnet into the same insertion hole, a problem of the phase shift in the rotation direction can be eliminated. The rare-earth magnet 2c and the ferrite magnet 2d are press-fitted into the magnet insertion hole 2b, or are clearance-fitted into the magnet insertion hole 2b in such a manner as not to affect the displacement.

The rotating-position detection sensor 7 is disposed on a surface of the control board 6 which faces the stator 1. The rotating-position detection sensor 7 is placed at a position opposed to one end surface of the rotor 2 in the axial direction, detects switching of NS of a magnetic flux of the ferrite magnet 2d to specify a position of the rotor 2 in the rotation direction, and outputs a position detection signal. A motor drive circuit which is not shown controls an operation of the permanent-magnet electric motor by applying a current to the winding 1c by using the position detection signal outputted from the rotating-position detection sensor 7. When having influenced by the magnetic flux generated by the current flowing through the winding 1c of the stator 1, the rotating-position detection sensor 7 may cause a malfunction. Therefore, the rotating-position detection sensor 7 is disposed apart from the winding 1c of the stator 1. On the other hand, to accurately detect the rotating position of the rotor 2, one end of the ferrite magnet 2d in the axial direction extends to a vicinity of the rotating-position detection sensor 7.

On the control board 6, in addition to the rotating-position detection sensor 7, there are provided a leading port 10 which is exposed from the molding resin 9 to the outside and leads a power lead wire 11 for supplying power to the winding 1c and a sensor lead wire 12 into the electric motor 100. Also, a board-in connector 8 connected to an end of the sensor lead wire 12 is disposed on the control board 6, and a terminal of the board-in connector 8 is electrically connected to electronic components by soldering. After the control board 6 has been assembled to the stator 1, a mold stator is obtained by molding the assembly with the molding resin 9. Then, the electric motor 100 is obtained by inserting the rotor 2 having the bearing 3 attached on one end into the mold stator and assembling the bracket 5.

The two kinds of magnets, i.e., the rare-earth magnet 2c and the ferrite magnet 2d, are inserted in the single magnet insertion hole 2b, and the ferrite magnet 2d is disposed one side of the rare-earth magnet 2c which is located closer to the rotating-position detection sensor 7 than the other side does. The length of the rare-earth magnet 2c in the axial direction is made equivalent to the axial length of the stator core 1a, and the rare-earth magnet 2c is used as the main magnet for generating the torque by an electromagnetic force with the current flowing through the winding 1c. To ensure that the magnetic flux entering the stator core 1a can be used efficiently, the length equivalent to the axial length of the stator core 1a refers to an axial length of the stator core 1a having a tolerance of ±10%.

An end of the rotor core 2a on the side of the rotating-position detection sensor overhangs from an end surface of the stator core 1a on the side of the rotating-position detection sensor to the side of the rotating-position detection sensor, and the end of the rotor core 2a extends to the vicinity of the rotating-position detection sensor. The ferrite magnet 2d is disposed in an overhanging part of the rotor core 2a and extends to the vicinity of the rotating-position detection sensor together with the rotor core so as to act as a position detecting magnet. In a case where the length of the rare-earth magnet 2c in the axial direction is shorter than the length of the rotor core 2a in the axial direction, the end of the ferrite magnet 2d on the side of the rare-earth magnet 2c is positioned on the side of the stator core 1a. However, most of the ferrite magnet 2d extends to the side of the rotating-position detection sensor from the end surface of the stator core 1a on the side of the rotating-position detection sensor.

Since the rotor is of the IPM type, an iron core is also disposed on the side of a surface of the magnet. Therefore, an effect can be obtained that a magnetic flux of the ferrite magnet 2d in the overhanging part flows through the iron core on a radially outer side of the magnet and enters the stator. That is, the ferrite magnet 2d in the overhanging part is a position detecting magnet and also has a magnetic flux assisting function to add the magnetic flux thereof to the magnetic flux of the rare-earth magnet 2c which is the main magnet.

Figure 2:
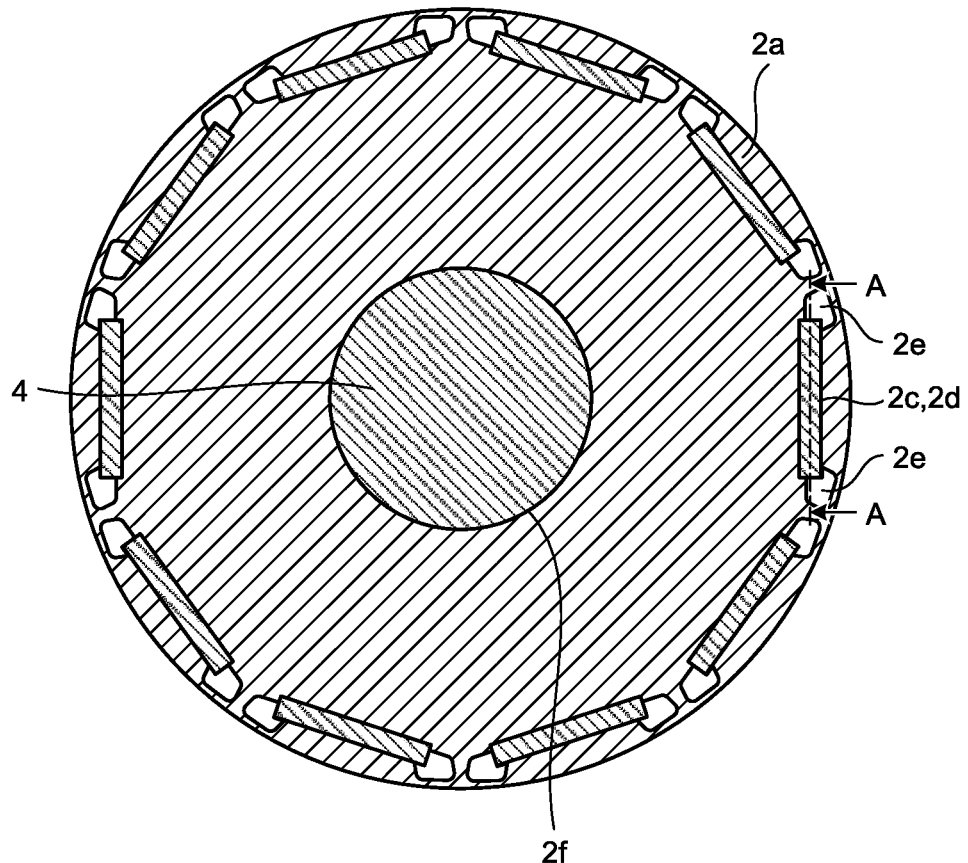
FIG. 2 is a cross-sectional view of a rotor of the permanent-magnet electric motor according to the first embodiment.
Figure 3:
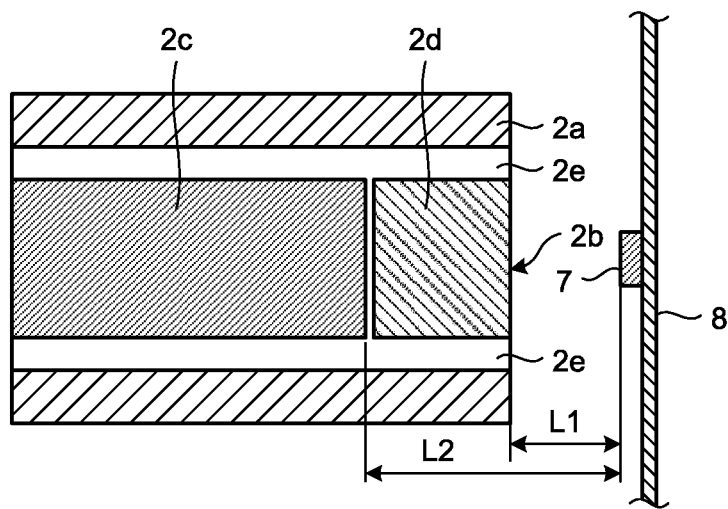
FIG. 3 is a cross-sectional view taken in the direction of arrows A of FIG. 2.

FIG. 2 is a cross-sectional view of the rotor of the permanent-magnet electric motor according to the first embodiment. FIG. 3 is a cross-sectional view taken in the direction of arrows A of FIG. 2. In the rotor core 2a, a shaft insertion hole 2f, magnet insertion holes 2b as many as poles, and flux barriers 2e formed at both ends of each of the magnet insertion holes 2b in the rotation direction are provided. In the illustrated example, ten poles of magnets are inserted into the magnet insertion holes 2b. The flux barriers 2e are provided to reduce a leakage magnetic flux which is a magnetic flux of the adjacent magnets leaked through the iron core. FIG. 3 illustrates the positional relation between the rare-earth magnet 2c and the ferrite magnet 2d inserted in the magnet insertion hole 2b. The left-and-right or horizontal direction in FIG. 3 corresponds to the axial direction of the rotor 2. The flux barrier 2e may be filled with air, or alternatively, an insulation material such as PBT, PPS, LCP, or PET may be inserted into the flux barrier 2e for fixing the magnets. When a distance from the ferrite magnet 2d to the rotating-position detection sensor 7 in the axial direction of the rotor 2 is L1 and a distance from the rare-earth magnet 2c to the rotating-position detection sensor 7 in the axial direction of the rotor 2 is L2, the distance L1 is shorter than the distance L2.

Figure 4:
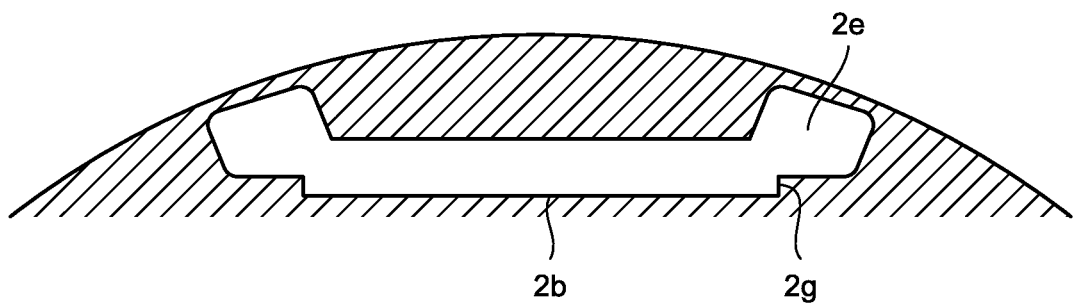
FIG. 4 is an enlarged view of a magnet insertion hole illustrated in FIG. 2.

FIG. 4 is an enlarged view of the magnet insertion hole illustrated in FIG. 3. The flux barriers 2e and the magnet insertion hole 2b are integrated, and magnet stoppers 2g for limiting the position of the magnets are formed at both ends of an inner surface of the magnet insertion hole 2b in the radial direction. Therefore, a region, which is surrounded by a side of the magnet insertion hole 2b on a radially inner side, a side of the magnet insertion hole 2b on a radially outer side, and sides of the magnet stoppers 2g, forms the magnet insertion hole 2b.

Figure 5:
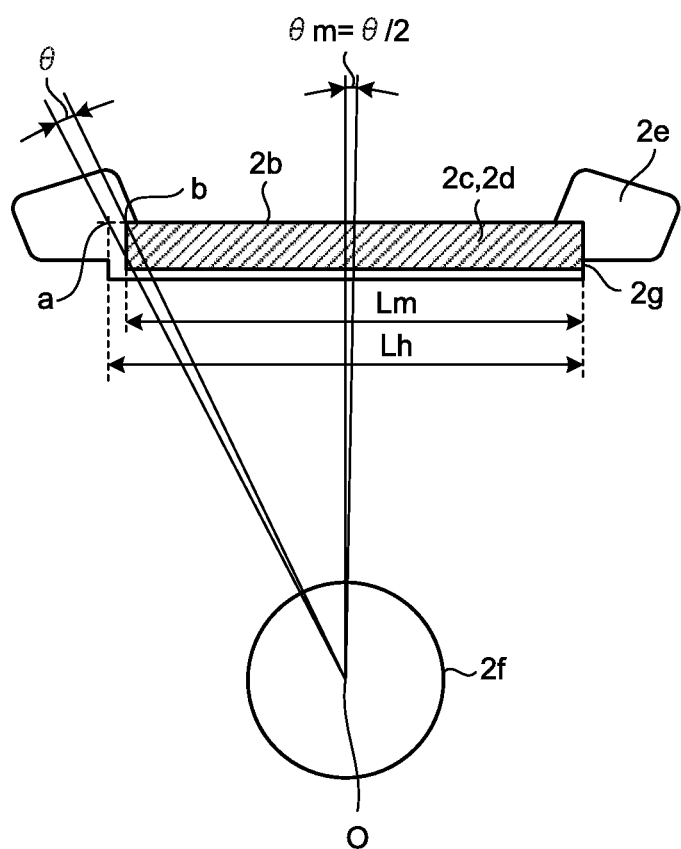
FIG. 5 is a view illustrating a relation between the magnet insertion hole and a width of a magnet in the longitudinal direction.

FIG. 5 is a view illustrating a relation between the magnet insertion hole and a width of a magnet in the longitudinal direction. The ferrite magnet 2d or the rare-earth magnet 2c illustrated in FIG. 1 is simply referred to as a magnet. The magnet is disposed in the magnet insertion hole 2b while having a lateral direction aligned with the radial direction of the rotor core 2a, and a longitudinal direction perpendicular to the radial direction. In FIG. 5, a length of the magnet insertion hole 2b in the longitudinal direction is represented by Lh and a magnet width in the longitudinal direction is represented by Lm. Also, reference character a indicates an intersection between a plane obtained by extending in the lateral direction a surface of the magnet stopper 2g on the left side in FIG. 5 opposed to the magnet, and a line obtained by extending in the longitudinal direction a surface of the magnet opposed to an inner surface of the magnet insertion hole 2b on the radially outer side. Reference b indicates a corner, which is one of corners of the magnet when the magnet is moved in the magnet insertion hole 2b in the longitudinal direction until it comes in contact with the magnet stopper 2g on the right side in FIG. 5, and which is positioned at an intersection between a short side of the magnet opposed to the magnet stopper 2g on the left side in FIG. 5, and a long side of the magnet on the radially outer side of the magnet. Reference character O indicates the center of the shaft. When an angle formed between a straight line a-O connecting a and O and a straight line b-O connecting b and O is represented by θ, θ is made as small as possible. This is effective in reducing the phase shift in the rotation direction between the rare-earth magnet 2c and the ferrite magnet 2d. A rotating position of the rotor 2 is defined by an induced voltage phase of the rare-earth magnet 2c which is the main magnet. However, since the induced voltage cannot be directly measured, a signal of the rotating-position detection sensor for detecting the magnetic flux of the position detection magnet is alternatively used. However, if the induced voltage phase is shifted from the signal of the rotating-position detection sensor, the rotating position of the rotor 2 cannot be accurately grasped. Therefore, a voltage cannot be applied at an appropriate timing, and this adversely affects the motor characteristics such as efficiency, output, and noise. In a case where the motor is applied to a fan motor mounted on an air conditioner, there is a possibility that troubles such as a decrease in a heating capacity of the air conditioner or an increase in power consumption occurs. When an amount of shift of the induced voltage from the signal of the rotating-position detection sensor is equal to or more than an electrical angle of 10°, the effect on the motor characteristics increases. Therefore, it is necessary to suppress the shift amount between the induced voltage and the signal of the rotating-position detection sensor to be less than 10°. Since the deviation between the induced voltage and the signal of the rotating-position detection sensor is an offset of the magnetic pole centers of the rare-earth magnet 2c and the ferrite magnet 2d, the deviation becomes the largest when the rare-earth magnet 2c and the ferrite magnet 2d are shifted in opposite directions from each other in the longitudinal direction of the magnet insertion hole 2b. When the number of poles of the motor is represented by P, conversion of an electrical angle θe into a mechanical angle θm is expressed by θm=θe/(P/2). Here, θm is the sum of an offset θmr of the magnetic pole center of the rare-earth magnet 2c and an offset θmf of the magnetic pole center of the ferrite magnet 2d, as can be represented by θmr+θmf, and the value θm becomes the largest when the rare-earth magnet 2c and the ferrite magnet 2d are displaced in the opposite directions with respect to the magnet insertion hole 2b. Thus, θm can be expressed as θmr+θmf=θe/(P/2). The relation between values θm and θ which is formed by a-O and b-O is geometrically expressed by θm=θ/2. Therefore, when the value θ of the rare-earth magnet 2c is represented by θr and the value θ of the ferrite magnet 2d is represented by θf, θr/2+θf/2=θe/(P/2) is satisfied. Since θe is desired to be less than 10°, the clearance is adjusted so that θr/2+θf/2<10°/(P/2) is satisfied. In the rotor 2 having 10 poles as illustrated in FIG. 2, θr/2+θf/2<10° (10/2)=2° is satisfied. The rotating-position detection sensor detects a magnetic flux leaked in the axial direction of the extended part of the ferrite magnet 2d magnetized in the radial direction. Therefore, it has a higher sensitivity in a direction aligned with an extended line of an outer circumferential surface of the rotor core 2a in which the ferrite magnet 2d is inserted, or a direction shifted obliquely from the extended line toward the stator.

Figure 6:
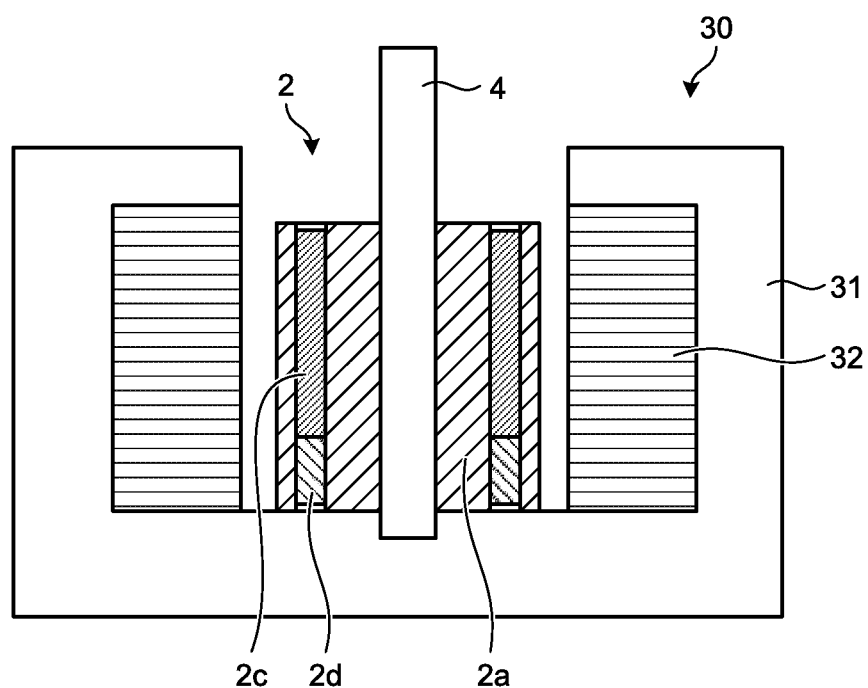
FIG. 6 is a cross-sectional view of a magnetizing device for magnetizing the rotor illustrated in FIG. 1.

FIG. 6 is a cross-sectional view of a magnetizing device for magnetizing the rotor shown in FIG. 1. The magnetizing device 30 includes a recessed frame 31 which is open upward, and a magnetizing yoke 32 disposed at an internal opening of the frame 31. The length of the magnetizing yoke 32 in the axial direction is formed to be longer than the length of the rotor 2 in the axial direction. The rotor 2 illustrated in FIG. 1 is inserted into the opening of the magnetizing device 30 so that the rare-earth magnet 2c faces the magnetizing yoke 32 as illustrated in FIG. 6. When a large current is instantaneously applied to a winding of the magnetizing yoke 32, the rare-earth magnet 2c and the ferrite magnet 2d are concurrently magnetized in a direction perpendicular to the axial direction by a magnetic flux from the magnetizing yoke 32. As a result, the N pole and the S pole of the rare-earth magnet 2c and the N pole and the S pole of the ferrite magnet 2d are magnetized with the same phase. In a case where a rotor in which the main magnet and the position detection magnet are divided into different pieces is used, a phase shift due to magnetization occurs. However, in the rotor 2 according to first embodiment, the phase shift due to the magnetization does not occur.

Second Embodiment

Figure 7:
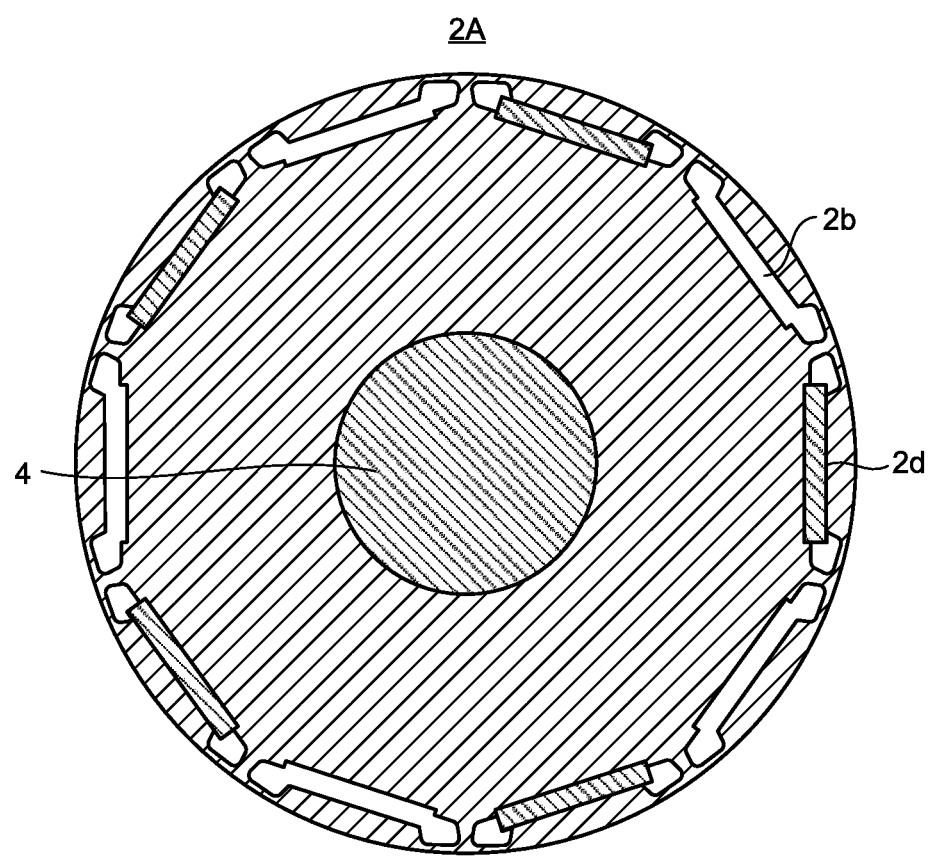
FIG. 7 is a cross-sectional view of a rotor of a permanent-magnet electric motor according to a second embodiment.

FIG. 7 is a cross-sectional view of a rotor of a permanent-magnet electric motor according to a second embodiment. In the second embodiment, a ferrite magnet 2d for detecting positions is inserted in every other magnet insertion hole 2b. Specifically, in a rotor 2A according to the second embodiment, a rare-earth magnet 2c is disposed in each of the plurality of magnet insertion holes 2b, and the ferrite magnet 2d is disposed in every other magnet insertion hole 2b in a rotation direction of a rotor core 2a. The ferrite magnet 2d disposed in every other magnet insertion hole 2b in the rotation direction of the rotor core 2a is disposed adjacent to the rare-earth magnet 2c disposed in each of the plurality of magnet insertion holes 2b in the axial direction. The length of the rotor core 2a in the axial direction is longer than the length of a stator core 1a in the axial direction, and the rare-earth magnet 2c is disposed in each of the plurality of magnet insertion holes 2b to be opposed to the stator core 1a in the radial direction of the stator core 1a. The ferrite magnet 2d disposed in every other magnet insertion hole 2b in the rotation direction of the rotor core 2a is disposed between the rare-earth magnet 2c disposed in the corresponding magnet insertion hole 2b of the plurality of magnet insertion holes 2b and a rotating-position detection sensor.

With this structure, a magnetic force becomes less than half in the rotor 2A. However, if there is no problem in position detection, the number of the ferrite magnets 2d is halved so that cost can be reduced. Also, it may be difficult to detect the position of the inter-magnet poles at a part where the ferrite magnet 2d is not inserted due to the disturbance of the magnetic flux depending on the shape of the iron core. In this case, the pole of a part including the magnet is detected. Although the number of times of detection of the rotor 2A per rotation is reduced by half, a cost reduction effect can be obtained on condition that a reduced detection frequency does not cause a problem.

The structures illustrated in the above embodiments indicate exemplary contents of the present invention and can be combined with other known technique. Further, the structures illustrated in the embodiments can be partially omitted and changed without departing from the scope of the present invention.

The invention claimed is:
1. A permanent-magnet electric motor comprising:
an annular stator core;
a rotor core that is disposed in the stator core and has a plurality of magnet insertion holes; and
a rotating-position detection sensor that is disposed to be opposed to the rotor core and detects a rotating position of the rotor core, wherein
in each of the plurality of magnet insertion holes, a rare-earth magnet and a ferrite magnet are disposed adjacent to each other in an axial direction of the rotor core,
the rare-earth magnet and the ferrite magnet are disposed in a single, identical magnet insertion hole,
a length of the rotor core in the axial direction is longer than a length of the stator core in the axial direction,
the rare-earth magnet is disposed in each of the plurality of magnet insertion holes to be opposed to the stator core in a radial direction of the stator core,
the ferrite magnet disposed in each of the plurality of magnet insertion holes is disposed between the rare-earth magnet disposed in a corresponding one of the plurality of magnet insertion holes and the rotating-position detection sensor, and
when a distance in the axial direction from the ferrite magnet to the rotating-position detection sensor is L1 and a distance in the axial direction from the rare-earth magnet to the rotating-position detection sensor is L2, the distance L1 is shorter than the distance L2.

2. The permanent-magnet electric motor according to claim 1, wherein
an end of the rotor core on the side of the rotating-position detection sensor overhangs from an end surface of the stator core on the side of the rotating-position detection sensor to the side of the rotating-position detection sensor and extends to a vicinity of the rotating-position detection sensor, and
the ferrite magnet is disposed in an overhanging part of the rotor core and extends to the vicinity of the rotating-position detection sensor together with the rotor core.

3. The permanent-magnet electric motor according to claim 1, wherein
the rare-earth magnet and the ferrite magnet disposed in each of the plurality of magnet insertion holes have been concurrently magnetized by a single magnetizing yoke.

4. A permanent-magnet electric motor comprising:
an annular stator core;
a rotor core that is disposed in the stator core and has a plurality of magnet insertion holes; and
a rotating-position detection sensor that is disposed to be opposed to the rotor core and detects a rotating position of the rotor core, wherein
a rare-earth magnet is disposed in each of the plurality of magnet insertion holes,
a ferrite magnet is disposed in every other magnet insertion hole of the plurality of magnet insertion holes in a rotation direction of the rotor core,
the ferrite magnet disposed in every other magnet insertion hole of the plurality of magnet insertion holes in the rotation direction of the rotor core is disposed axially adjacent to the rare-earth magnet disposed in a corresponding one of the plurality of magnet insertion holes,
a length of the rotor core in the axial direction is longer than a length of the stator core in the axial direction,
the rare-earth magnet is disposed in each of the plurality of magnet insertion holes to be opposed to the stator core in a radial direction of the stator core,
the ferrite magnet disposed in every other magnet insertion hole of the plurality of magnet insertion holes in the rotation direction of the rotor core is disposed between the rare-earth magnet disposed in a corresponding magnet insertion hole of the plurality of magnet insertion holes and the rotating-position detection sensor, and
when a distance in the axial direction from the ferrite magnet to the rotating-position detection sensor is L1 and a distance in the axial direction from the rare-earth magnet to the rotating-position detection sensor is L2, the distance L1 is shorter than the distance L2.

5. The permanent-magnet electric motor according to claim 4, wherein
an end of the rotor core on the side of the rotating-position detection sensor overhangs from an end surface of the stator core on the side of the rotating-position detection sensor to the side of the rotating-position detection sensor and extends to a vicinity of the rotating-position detection sensor, and
the ferrite magnet disposed in every other magnet insertion hole of the plurality of magnet insertion holes in a circumferential direction is disposed in an overhanging part of the rotor core and extends to the vicinity of the rotating-position detection sensor together with the rotor core.

6. The permanent-magnet electric motor according to claim 4, wherein
the rare-earth magnet disposed in each of the plurality of magnet insertion holes and the ferrite magnet disposed in every other magnet insertion hole in the circumferential direction have been concurrently magnetized by a single magnetizing yoke.

\* \* \* \* \*